United States Patent
Ikuno et al.

(10) Patent No.: US 9,017,556 B2
(45) Date of Patent: Apr. 28, 2015

(54) ULTRAPURE WATER PRODUCTION METHOD AND APPARATUS THEREFOR

(75) Inventors: Nozomu Ikuno, Tokyo (JP); Motomu Koizumi, Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 939 days.

(21) Appl. No.: 13/138,087

(22) PCT Filed: Dec. 21, 2009

(86) PCT No.: PCT/JP2009/071218
§ 371 (c)(1),
(2), (4) Date: Jul. 28, 2011

(87) PCT Pub. No.: WO2010/079684
PCT Pub. Date: Jul. 15, 2010

(65) Prior Publication Data
US 2011/0278222 A1    Nov. 17, 2011

(30) Foreign Application Priority Data

Jan. 6, 2009 (JP) ................. 2009-000912

(51) Int. Cl.
| C02F 3/00 | (2006.01) |
| C02F 9/00 | (2006.01) |
| C02F 1/76 | (2006.01) |
| C02F 3/12 | (2006.01) |
| C02F 1/32 | (2006.01) |

(Continued)

(52) U.S. Cl.
CPC ... *C02F 9/00* (2013.01); *C02F 1/32* (2013.01); *C02F 1/42* (2013.01); *C02F 1/441* (2013.01); *C02F 1/444* (2013.01); *C02F 1/763* (2013.01); *C02F 3/1226* (2013.01); *C02F 2101/16* (2013.01); *C02F 2101/38* (2013.01); *C02F 2103/04* (2013.01); *C02F 2209/22* (2013.01); *C02F 2301/063* (2013.01)

(58) Field of Classification Search
USPC .................. 210/753–756, 220, 620, 614, 739
See application file for complete search history.

(56) References Cited

U.S. PATENT DOCUMENTS 8,065,906 B2 * 11/2011 Wiese .......................... 73/61.43

FOREIGN PATENT DOCUMENTS

| CN | 1504430 A | 6/2004 |
| CN | 201010557 Y | 1/2008 |

(Continued)

OTHER PUBLICATIONS

TIPO, "Office Action", Nov. 8, 2013.

(Continued)

*Primary Examiner* — Chester Barry
(74) *Attorney, Agent, or Firm* — Manabu Kanesaka

(57) ABSTRACT

Ultrapure water of high purity having extremely low TOC concentration is produced by efficiently degrading urea in raw water by biological activated carbon treatment even when the raw water contains ammonium nitrogen. The ultrapure water production method, where raw water is treated in a primary pure water system, and then the resulting water is treated in a subsystem, contains a step of treating pretreated water with chlorine based oxidizer added by a biological treatment means installed upstream to the subsystem. Chlorine based oxidizer is added so that the chlorine based oxidizer concentration is 5 times or more than the ammonium nitrogen concentration of water treated in the biological treatment means in terms of $Cl_2$.

8 Claims, 2 Drawing Sheets

Water System Containing Ammonium Nitrogen

(51) Int. Cl.
 *C02F 1/42* (2006.01)
 *C02F 1/44* (2006.01)
 *C02F 101/16* (2006.01)
 *C02F 101/38* (2006.01)
 *C02F 103/04* (2006.01)

(56) References Cited

FOREIGN PATENT DOCUMENTS

| | | |
|---|---|---|
| JP | S57-144084 | 9/1982 |
| JP | H04-225681 | 8/1991 |
| JP | H05-022312 | 1/1993 |
| JP | H06-108217 | 4/1994 |
| JP | H07-284799 | 10/1995 |
| JP | 2002-336887 | 11/2002 |
| JP | 2004-330182 | 11/2004 |

OTHER PUBLICATIONS

The State Intellectual Property Office of China, "First Notification of Office Action for CN 200980153858.9", Nov. 5, 2012.

* cited by examiner

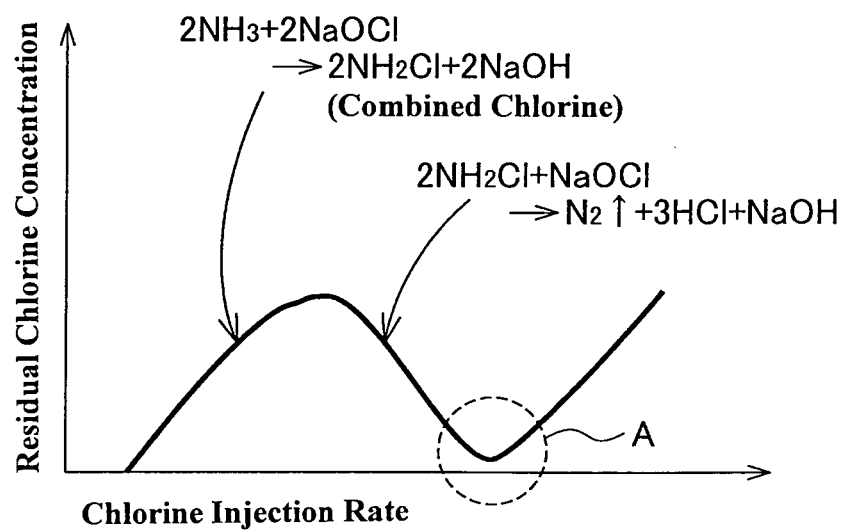
Fig. 2  Water System Containing Ammonium Nitrogen

ULTRAPURE WATER PRODUCTION METHOD AND APPARATUS THEREFOR

RELATED APPLICATIONS

The present application is National Phase of International Application No. PCT/JP2009/071218 filed Dec. 21, 2009, and claims priority from Japanese Application No. 2009-000912, filed Jan. 6, 2009, the disclosure of which is hereby incorporated by reference herein in its entirety.

FIELD OF INVENTION

The present invention relates to an ultrapure water production method and apparatus, and specifically, it relates to a method and apparatus for producing ultrapure water having extremely low Total Organic Carbon (TOC) concentration by removing urea therein at high levels.

BACKGROUND OF INVENTION

Conventionally, ultrapure water used as semiconductor water cleaning water is produced by treating raw water (industrial water, city water, well water, and used ultrapure water discharged from semiconductor plants (hereinafter referred to as "recovered water")) with an ultrapure water production apparatus including a pretreatment system, primary pure water system, and subsystem (or secondary pure water system).

Ultrapure water produced with a conventional ultrapure water production apparatus contains about 2-5 µg/L of TOC (Total Organic Carbon). Methods for further reducing TOC in ultrapure water may include installation of multi-stage reverse osmosis membrane separation devices and increasing the ultraviolet irradiation dose in a low pressure ultraviolet light oxidation device, but these methods have not been successful in sufficiently reducing TOC in ultrapure water.

Patent document 1 discloses that raw water (city water, industrial water and the like) that is to become ultrapure water contains several tens to several hundreds of µg/L of urea, and that the major component of the TOC remaining in the ultrapure water is urea ($NH_2CONH_2$). Patent document 1 discloses that, in an ultrapure water production apparatus including a pretreatment device for raw water, primary pure water production device and subsystem, urea in raw water is highly removed at high levels and TOC in ultrapure water is reduced by incorporating a biological activated carbon device as a biological treatment device into the pretreatment device.

Patent document 2 discloses, in relation to the method disclosed in Patent document 1, that recovered semiconductor cleaning water is mixed with raw water and supplied to the biological activated carbon device with a view to improving the urea degradation rate.

Patent document 3 discloses that raw water (not including recovered water and recovered water) are separately treated with biological activated carbon and then supplied to the primary pure water production device to prevent the biological activated carbon treatment of urea from being inhibited by ammonium ions in the recovered semiconductor cleaning water.

Patent document 4 discloses that, in an ultrapure water production apparatus where a biological activated carbon column is installed in the primary pure water device, for the purpose of restricting the leakage of excessive fungi by adequately curbing the activities of living organisms in the biological activated carbon column and preventing the spillage of microorganisms into a downstream device, an oxidation agent such as hypochlorite is added to feed water which is supplied to the biological activated carbon column so that the residual chlorine concentration of the feed water is 0.5-5 mg/L.

LIST OF DOCUMENTS

Patent Documents

Patent document 1: Japanese Patent No. 3468784
Patent document 2: Japanese Patent No. 3227863
Patent document 3: Japanese Patent No. 3417052
Patent document 4: Japanese Patent Publication 2002-336887

SUMMARY OF INVENTION

Problems to be Solved by the Invention

Urea contained in raw water that is to become ultrapure water can be removed with a biological activated carbon device. However, as described in Patent document 3, when ammonium ions are contained in the feed water to the biological activated carbon device, the ammonium ions inhibit the biological activated carbon treatment of urea. In the method described in Patent document 3, raw water not including recovered water and recovered water are separately treated with respective biological activated carbon devices to prevent the inhibiting activities of the ammonium ions. However, this method requires separate biological activated carbon devices for the raw water system and for the recovered water system, and it takes up much space and complicates the operational control of the apparatus.

In the method described in Patent document 2, recovered water is added to raw water, but the biological activated carbon treatment is inhibited due to the ammonium ions in the recovered water.

Patent document 4 discloses that an oxidation agent such as a hypochlorite is added to the feed water of the biological activated carbon column. The purpose for adding the oxidation agent of Patent document 4 is to restrict the leakage of excessive fungi by adequately curbing the activities of living organisms supported in the biological activated carbon and prevent the spillage of microorganisms into a downstream device. Inhibition of biological activated carbon treatment of urea by the ammonium ions is not prevented.

The objective of the present invention is to provide a method for producing ultrapure water and an apparatus for doing the same, where the method and apparatus are capable of efficiently decomposing urea in raw water by biological activated carbon treatment and producing ultrapure water of high purity, having markedly low TOC concentration even when ammonium nitrogen is contained in the raw water.

Means for Solving the Problems

An ultrapure water production method of a first aspect treats raw water in the primary pure water system and then treats the resulting water in the subsystem, wherein the method includes a step of treating water to be treated, after a chlorine based oxidizer is added thereto, in a biological treatment means installed upstream of the subsystem, and wherein the chlorine based oxidizer is added so that the concentration of the chlorine based oxidizer in terms of $Cl_2$ is 5 times or more than the ammonium nitrogen concentration of water to be treated in the biological treatment means.

An ultrapure water production method of a second aspect is characterized in that, in the first aspect, the chlorine based oxidizer is added so that the difference between the dissolved oxygen concentration of inlet water of the biological treatment means and the dissolved oxygen concentration of outlet water of the biological treatment means is 200 to 2,000 μg/L.

An ultrapure water production method of a third aspect is characterized in that, in the first of second aspect, the biological treatment means is a biological activated carbon column.

An ultrapure water production method of a fourth aspect is characterized in that, in the first to third aspects, the chlorine is added so that the concentration of the chlorine based oxidizer in terms of $Cl_2$ concentration is 5 to 8 times by weight the ammonium nitrogen concentration of water in the biological treatment means.

An ultrapure water production method of a fifth aspect is characterized in that, in the first to fourth aspects, the ultrapure water production method treats raw water in a pretreatment system and then treats the resulting water in the primary pure water system and subsystem in this order, wherein the chlorine based oxidizer is added to water to be treated in the pretreatment system, and wherein the biological treatment means is installed at the last stage of the pretreatment system and/or at the first stage of the primary pure water system.

An ultrapure water production apparatus of a sixth aspect includes a primary pure water system which treats raw water, and a subsystem which treats water treated by the primary pure water system, where the ultrapure water production apparatus includes a chlorine based oxidizer adding means which adds chlorine based oxidizer to water to be treated, and a biological treatment means installed upstream of the subsystem which treats the water to which the chlorine based oxidizer is added, where the chlorine based oxidizer adding means adds chlorine based oxidizer so that the concentration of the chlorine based oxidizer in terms of $Cl_2$ is 5 times or more than the ammonium nitrogen concentration of water to be treated in the biological treatment means.

An ultrapure water production apparatus of a seventh aspect is characterized in that, in the sixth aspect, the chlorine based oxidizer adding means adds chlorine based oxidizer so that the difference between the dissolved oxygen concentration of inlet water of the biological treatment means and the dissolved oxygen concentration of outlet water of the biological treatment means is 200 to 2,000 μg/L.

An ultrapure water production apparatus of an eighth aspect is characterized in that, in the sixth or seventh aspect, the biological treatment means is a biological activated carbon column.

An ultrapure water production apparatus of a ninth aspect is characterized in that, in the sixth to eighth aspects, the chlorine based oxidizer adding means adds chlorine based oxidizer so that the concentration of the chlorine based oxidizer in terms of $Cl_2$ is 5 to 8 times by weight the ammonium nitrogen concentration of water treated in the biological treatment means.

An ultrapure water production apparatus of a tenth aspect is characterized in that, in the sixth to ninth aspects, the apparatus further includes a pretreatment system which treats raw water, wherein the water treated in the pretreatment system is then treated in the primary pure water system and subsystem in this order, the chlorine based oxidizer is added to water to be treated in the pretreatment system by the chlorine based oxidizer adding means, and the biological treatment means is installed at the last stage of the pretreatment system and/or at the first stage of the primary pure water system.

According to the present invention, by way of adding chlorine based oxidizer having a concentration of more than 5 times by weight, preferably 5-8 times by weight the ammonium nitrogen of treated water of the biological treatment means in terms of $Cl_2$, all or a portion of the ammonium nitrogen is degraded to nitrogen ($N_2$) by the chlorine based oxidizer and is removed. Thus, biological treatment inhibition of urea by ammonium nitrogen is prevented, and large quantities of urea can be removed in the biological treatment means. As a result, high quality ultrapure water having an extremely low TOC concentration can be obtained.

The additive amount of chlorine based oxidizer of the present invention is further preferably controlled based upon the difference between the dissolved oxygen concentration of inlet water of the biological treatment means and the dissolved oxygen concentration of outlet water of the biological treatment means. By doing so, it becomes possible to sufficiently ensure the amount of organic substances degraded by the microorganisms inhabiting the biological treatment means, and to avoid the problem posed by the excessive proliferation of fungi in the biological treatment means, and thus to remove urea with efficiency.

For the biological treatment means in the present invention, specifically a biological activated carbon column is preferably used, and more specifically a fixed bed biological activated carbon column is preferably used.

In producing ultrapure water in general, raw water is sequentially treated in a pretreatment system, primary pure water system and subsystem. In the present invention, the chlorine based oxidizer is preferably added to raw water in the pretreatment system, because slime problems and the like can be controlled by the sterilizing effects of the chlorine based oxidizer in the upstream device. The biological treatment means in the present invention is preferably installed at the last stage of the pretreatment system and/or at the first stage of the primary pure water system.

BRIEF DESCRIPTION OF DRAWINGS

FIG. 2 is a graph showing the relationship between the amount of chlorine addition and the concentration of residual chlorine.

DESCRIPTION OF EMBODIMENTS

Figure 1:
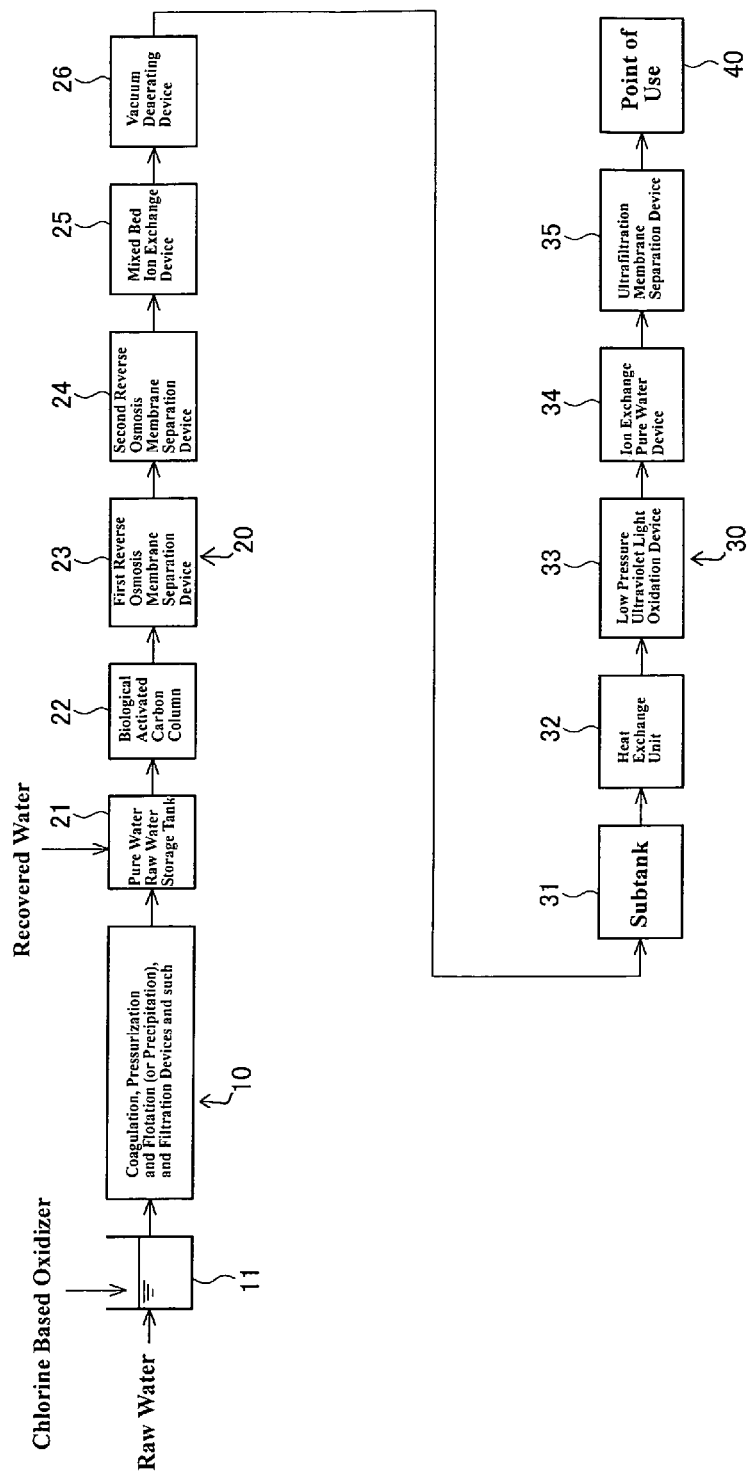
FIG. 1 is a flow diagram showing an embodiment of the ultrapure water production method and apparatus of the present invention.

An embodiment of the ultrapure water production method and apparatus of the present invention is hereafter described in detail.

In the present invention, when producing ultrapure water by treating raw water in the primary pure water system and subsystem, pretreated water is treated with a biological treatment device by adding a prescribed amount of chlorine based oxidizer in the upstream step to the subsystem.

In the present invention, preferably as show in FIG. 1, a chlorine based oxidizer is added to raw water, and the resulting water is treated with the ultrapure water production apparatus including a pretreatment system 10, a primary pure water system 20, and a subsystem (or secondary pure water system) 30. The role of each system in FIG. 1 is as follows.

The pretreatment system 10 including coagulation, pressurization and flotation (or precipitation), and filtration (or membrane filtration) devices and the like removes suspended substances and colloid substances in raw water. Polymeric organic substances and hydrophobic organic substances may also be removed in this process.

The primary pure water system 20 including a reverse osmosis membrane separation device, deaerating device and ion exchange device such as a mixed bed ion exchange device or a 4-bed 5-column ion exchange device removes ions and organic components from raw water. The reverse osmosis membrane separation device removes salts as well as ionic TOC and colloidal TOC components. The ion exchange device removes salts as well as TOC components adsorbed or ion exchanged by ion exchange resin. The deaerating device removes inorganic carbon (ID) and dissolved oxygen (DO).

The subsystem 30 including a low pressure ultraviolet oxidation device, an ion exchange pure water device and an ultrafiltration membrane separation device further enhances the purity of the pure water obtained in the primary pure water system 20. The low pressure ultraviolet oxidation device degrades TOC to organic acid and further to $CO_2$ with ultraviolet light having a wavelength of 185 nm emitted from a low pressure ultraviolet lamp. The organic substances and $CO_2$ produced by the degradation are removed by ion exchange resin in the next step. The ultrafiltration membrane separation device removes particulates as well as particles ejected from the ion exchange resin.

A preferred embodiment of the present invention is hereafter described in detail with reference to FIG. 1, but the present invention is not limited to the following description.

In FIG. 1, a chlorine based oxidizer is added to raw water such as industrial water in a raw water storage tank 11. The resulting water is then treated in the pretreatment system 10 including coagulation, pressurization and flotation (or precipitation), filtration (or membrane filtration) devices and such, and the pretreated water is introduced into a pure water raw water storage tank 21. Recovered water is circulated into the pure water raw water storage tank 21. The water in the pure water raw water storage tank 21 is treated in the primary pure water system 20 including a biological activated carbon column 22 as a biological treatment means, a first reverse osmosis membrane separation device 23, a second reverse osmosis membrane separation device 24, a mixed bed ion exchange device 25 and a vacuum deaerating device 26. The primary pure water obtained in the primary pure water system 20 is transported to a sub storage tank 31, and then treated in the subsystem 30 including a heat exchange unit 32, a low pressure ultraviolet oxidation device 33, an ion exchange pure water device 34 and an ultrafiltration membrane separation device 35. The ultrapure water obtained in the subsystem 30 is then transported to a point of use 40.

In the ultrapure water production apparatus shown in FIG. 1, a chlorine based oxidizer is added to the raw water storage tank 11, and slime problems are prevented due to the sterilizing effects of the chlorine based oxidizer in the downstream filtration device and other devices. Chlorine based oxidizer added water is mixed with recovered water containing ammonium nitrogen, which is degraded by the chlorine based oxidizer added to raw water. So, TOC such as urea is effectively degraded in the biological activated carbon column 22 without incurring biological treatment impairments caused by ammonium nitrogen, and high quality treated water is obtained by removing impurities and enhancing purity in the downstream device. Recovered water is circulated to the pure water raw water storage tank 21 in the embodiment, but it may also be circulated to the raw water storage tank 11, in which case the biological activated carbon column 22 may be installed, for example, immediately upstream of the pure water raw water storage tank 21.

[Amount of Added Chlorine Based Oxidizer]

In the present invention, chlorine based oxidizer is added so that the concentration of the chlorine based oxidizer is more than 5 times by weight, preferably 5-8 times by weight the ammonium nitrogen concentration of water treated in the biological treatment means, i.e., feed water of the biological treatment means, in terms of $Cl_2$. Hereinafter, the weight ratio of the chlorine based oxidizer to the ammonium nitrogen concentration in the feed water of the biological treatment means may be expressed as "$Cl_2/NH_4$—N ratio".

The reason for adding the chlorine based oxidizer so that the $Cl_2/NH_4$—N ratio is more than 5 times, preferably 5-8 times by weight in the present invention is described below with reference to FIG. 2.

As shown in FIG. 2, when ammonium nitrogen is present in water, as the amount of added chlorine based oxidizer increases, residual chlorine concentration, which corresponds to the sum of combined chlorine concentration and free chlorine concentration of water, rises as combined chlorine concentration, but from the point where the amount of added chlorine based oxidizer reaches 4-5 times the ammonium nitrogen amount by weight in terms of $Cl_2$, residual chlorine concentration begins to fall. This shows that the ammonium nitrogen present in the water is degraded to nitrogen by the chlorine based oxidizer according to the following reaction equation. Adding the chlorine based oxidizer in an amount of about 8 times the amount of the ammonium nitrogen by weight in terms of $Cl_2$ completely degrades the ammonium nitrogen present in the water to nitrogen and thus, the ammonium nitrogen is removed.

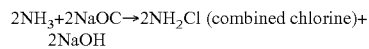

$2NH_3 + 2NaOCl \rightarrow 2NH_2Cl$ (combined chlorine) + $2NaOH$

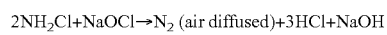

$2NH_2Cl + NaOCl \rightarrow N_2$ (air diffused) + $3HCl + NaOH$

Accordingly, in the present invention, adding chlorine based oxidizer so that the $Cl_2/NH_4$—N ratio is more than 5 by weight, preferably 5-8 by weight reduces the ammonium nitrogen concentration of water. Concurrently the residual chlorine (or combined chlorine) curbs the excessive proliferation of fungi breeding in the biological treatment means. When the amount of added chlorine based oxidizer is smaller than the amount falling within the range designated above, impairments in biological treatment of urea caused by ammonium nitrogen or excessive proliferation of fungi cannot be sufficiently inhibited. On the other hand, adding too much chlorine based oxidizer is undesirable, because in this case not only is improvement in the efficiency with which urea is treated not expected, but also the activity of fungi subsides and the ion load on the downstream device increases with excessive addition of the chlorine based oxidizer.

Aforementioned Patent document 4 discloses that an oxidation agent such as a hypochlorite is added to feed water which is supplied to the biological activated carbon column so that the residual chlorine concentration of the feed water is 0.5-5 mg/L. As shown in FIG. 2, when chlorine based oxidizer is added to water containing ammonium nitrogen, the concentration of residual chlorine, which is the sum of combined chlorine and free chlorine, once increases, then falls, and then rises again. So, the range designated by "residual chlorine concentration of 0.5-5 mg/L" as described in Patent document 4 exists in two points with respect to the amount of added chlorine based oxidizer.

In the present invention, chlorine based oxidizer is added in an amount which is able to remove ammonium nitrogen in water for certain in the form of $N_2$ as shown in the circled region A in FIG. 2. Patent document 4 discloses that an oxidizer is added so that the residual chlorine concentration of 0.5-5 mg/L is attained with a view to adequately restricting the activity of living organisms supported in biological activated carbon and thus curbing the leakage of excessive fungi to prevent the outflow of microorganisms to the next device. The present invention differs from the invention described in Patent document 4 in this respect.

In the present invention, the ammonium nitrogen concentration of treated water, which is the benchmark of the amount of added chlorine based oxidizer, is not the ammonium nitrogen concentration of water to which chlorine based oxidizer is added, but the ammonium nitrogen concentration of feed water of the biological treatment means, which is introduced into and treated in the biological treatment means, i.e., the inlet water of the biological treatment means, and of feed water which would have been present if chlorine based oxidizer had not been added. Accordingly, in the case where ammonium nitrogen is mixed with water in the process of reaching the downstream biological treatment means, for example, when recovered water is mixed after chlorine based oxidizer is added, the amount of added chlorine based oxidizer is determined on the basis of the amount of mixed ammonium nitrogen.

The ammonium nitrogen concentration of feed water of the biological treatment means may be determined by measuring the ammonium nitrogen concentration of water treated in the biological treatment means with an indophenol method or such. When water not containing ammonium nitrogen such as industrial water and water containing ammonium nitrogen such as recovered water are introduced into the biological treatment means, the ammonium nitrogen concentration can be calculated from the ammonium nitrogen concentration of each type of water and their introduction ratio. An ammonium nitrogen concentration meter may be installed at the inlet port of the biological treatment means.

The amount of added ammonium nitrogen can be controlled by adjusting the $Cl_2/NH_4$—N ratio calculated from the ammonium nitrogen concentration of the feed water of the biological treatment means derived as described above. Additionally, ammonium nitrogen may be added and controlled so that the $Cl_2/NH_4$—N ratio assumes a prescribed value from the relation between the measured value of free chlorine concentration at the inlet port of the biological treatment means measured by oxidation reduction potential or with a free chlorine concentration meter, and the concentration of chlorine based oxidizer in terms of $Cl_2$.

In the present invention, chlorine based oxidizer is preferably added so that the difference (hereinafter may be referred to as "ΔDO") between the dissolved oxygen (DO) concentration of inlet water of the biological treatment means and the DO concentration of outlet water of the biological treatment means is 200-2,000 μg/L, provided that the $Cl_2/NH_4$—N ratio is more than 5 by weight, preferably in the range of 5-8 by weight.

The reason for this is as follows:

Microorganisms present in water use DO (i.e., $C+O_2 \rightarrow CO_2$) in decomposing organic substances, so it is possible to verify the state of biological treatment by the difference between the DO amount at the inlet port and that at the outlet port of the biological treatment means. When ΔDO between the inlet and outlet ports of the biological treatment means is less than 200 μg/L, the degradation capability of organic substances in the biological treatment means is not sufficient, and urea contained in water is not removed by the biological treatment means, leaks into the downstream device, and results in an increasing TOC concentration at a point of use. On the other hand, when ΔDO is more than 2000 μg/L, urea in the biological treatment means can be degraded, but fungi in the biological treatment means are excessively bred, and, for example, if the biological treatment means is a biological activated carbon column, obstruction of the following device (e.g., safety filter, reverse osmosis membrane separation device, etc.) may result from the rise in inner column differential pressure or from fungi leaked from the inside of the column. Accordingly, upon adjusting the amount of added chlorine based oxidizer using the $Cl_2/NH_4$—N ratio described above, ΔDO between the inlet and outlet ports of the biological treatment means is preferably adjusted in the range of 200-2000 μg/L.

ΔDO may easily be controlled by mounting a DO meter at each of the inlet and outlet ports of the biological treatment means and by measuring the DO concentration at each port, and then calculating the difference between the measured concentrations. Generally, the amount of added chlorine based oxidizer is reduced when ΔDO is too high, and the amount of added chlorine based oxidizer is increased when ΔDO is too low.

[Types of Chlorine Based Oxidizer]

The chlorine based oxidizer used in the present invention is not of the combined chlorine type, but it is sufficient that it be of the free chlorine type which can degrade ammonium nitrogen into nitrogen by a reaction with ammonium nitrogen. The chlorine based oxidizer is not limited in any other way, and it may be a hypochorite or its salt, chlorous acid or its salt, perchloric acid or its salt or such. One of these may be independently used, or two or more of these may concurrently be used.

[Point where Chlorine Based Oxidizer is Added]

The point where chlorine based oxidizer is added is not particularly limited as long as it is upstream of the biological treatment means. However, with a view to curbing the breeding of microorganisms by adding chlorine based oxidizer in the pipes and storage tanks leading to the biological treatment means, it is preferably added in the early steps of the process, and it is more preferably added at a point upstream of the coagulation storage tank of the pretreatment system. When chlorine based oxidizer is added at a point upstream of the coagulation storage tank, Fe, Mn and the like originating from the raw water can be oxidized by the chlorine based oxidizer and thus have their solubility lowered, which can enhance the removal efficiency of Fe and Mn by coagulation and precipitation. When Fe, Mn and the like are transported to the reverse osmosis membrane separation device without being removed, there is a possibility that the reverse osmosis membrane incur fouling by these substances. So it is advantageous to remove Fe and Mn in advance allowing for stable operation of the apparatus.

When raw water does not require pretreatment such as coagulation and precipitation, chlorine based oxidizer is preferably added to the raw water storage tank.

Chlorine based oxidizer may be added not only at one point but at two or more points.

In any of the cases above, the total amount of chlorine based oxidizer added needs to fulfill the aforementioned condition of the $Cl_2/NH_4$—N ratio with respect to the ammonium nitrogen concentration of the feed water of the biological treatment means.

[Biological Treatment Means]

The biological treatment means of the present invention is not particularly limited, but it is preferably a biological activated carbon column, and it is more preferably a fixed bed type biological activated carbon column for the following reason.

When a fluidized bed type is used, the problem of rising differential pressure inside the biological activated carbon column caused by fungi does not occur, but the column constantly discharges excessive fungi and powdered carbon produced by friction of activated carbon out of the system, which requires a large scale SS separation device, i.e., an ultrafiltration membrane separation device or a coagulation and precipitation device as a downstream device.

In contrast, by adjusting the ΔDO of the inner biological activated carbon column to the value described above, and by passing water through a fixed bed type biological activated carbon column, it is possible not only to curb the rise of inner column differential pressure, but also to reduce the amount of fungi leakage to the downstream device, and the need for an SS separation device in the downstream stage can be reduced.

[Installation Point of the Biological Treatment Means]

The installation point of the biological treatment means is not particularly limited as long as it is upstream of the subsystem. However, it is preferably installed at the last stage of the pretreatment system, i.e., the point following coagulation, pressurization and flotation (or precipitation), and filtration (or membrane filtration) devices and the like which are ordinarily set up in a pretreatment system, or at the first stage of the primary pure water system, i.e., the point prior to a reverse osmosis membrane separation device, a deaerating device and an ion exchange device of a mixed bed type or a 4-bed 5-column type which are ordinarily set up in a primary pure water system. Or it may be installed at both points. Particularly, in view of treatment efficiency, it is preferably installed at the first stage of the primary pure water system.

As described in the following section on a biological activated carbon column, the reason for above is because life-span of a biological activated carbon column can be extended by removing polymeric organic substances in the pretreatment system, and removing low molecular organic substances in the biological treatment means, specifically the biological activated carbon column.

[Biological Activated Carbon Column]

A biological activated carbon column preferably used as a biological treatment means in the present invention is hereafter described.

The process of removing organic substances in a biological activated carbon column includes the steps of:
 (i) adsorbing organic substances by using activated carbon;
 (ii) decomposing organic substances by using a biological membrane; and
 (iii) biological reproduction which recovers pore volume by degrading organic substances adsorbed on activated carbon by microorganisms in the biological activated carbon column. By using biological activated carbon, the time period until the adsorbability of activated carbon is saturated is substantially extended.

In such a biological activated carbon column, increased pressure loss in the column due to breeding of microorganisms in the column is of concern. However, in the present invention, chlorine based oxidizer added water is treated, and particularly the ΔDO is controlled within a prescribed range, thus excessive breeding of microorganisms in the column is curbed, and such clogging is reduced.

In a reverse osmosis membrane separation device and an ion exchange device installed next to a biological activated carbon column, clogging caused by excessive fungi leaked from the biological activated carbon column is of concern, but as mentioned above, the leakage of fungi can be maintained to a minimum by controlling the ΔDO and curbing the proliferation of excessive fungi in the biological activated carbon column, and thus clogging in the reverse osmosis membrane separation device and the ion exchange device can be prevented.

Biodegradable organic substances are almost completely degraded and removed in the biological activated carbon column, thus breeding of microorganisms can be curbed in the downstream device.

For the following reason, the feed water of the biological activated carbon column is preferably water obtained by treating raw water in the pretreatment system including coagulation, pressurization and flotation (or precipitation), and filtration devices and the like, so, as mentioned above, the biological activated carbon column is preferably installed at the last stage of the pretreatment system and/or at the first stage of the primary pure water system.

Namely, water that has not gone through pretreatment such as coagulation and precipitation has a high proportion of polymeric organic components having low biodegradability among organic components, and when such water is passed through a biological activated carbon column, degradation of organic substances and reproduction of activated carbon by the living organisms mentioned above cannot be obtained, which leads to early breakthrough of activated carbon. On the other hand, when the biological activated carbon column is installed at the last stage of the pretreatment system and/or at the first stage of the primary pure water system, and pretreated water is passed through the biological activated carbon column, then polymeric organic substances are removed in the pretreatment system, and low molecular organic substances are removed by biological activated carbon. Biological activated carbon biologically degrades low molecular organic substances, which markedly extends the life span of the biological activated carbon.

The biological activated carbon column increases the dissolved oxygen concentration of the feed water of the biological activated carbon column, so it may be installed downstream of the decarbonation column. From the perspective of removing excessive fungi leakageed out from the biological activated carbon column, it is preferably installed upstream of the reverse osmosis membrane separation device.

The type of activated carbon packed in the biological activated carbon column may be any of coal, carbonized coconut shell, and the like, and there are no limitations regarding shape, kind and such, i.e., it may be any of crushed coal, granulated coal, formed coal, cross form, fiber form and others.

Method for packing activated carbon into the biological activated carbon column may be any of a fluidized bed, an expanded bed, a fixed bed and the like, but a fixed bed is preferable as it causes the least leakage of fungi as described above. The manner in which water is made to flow in the biological activated carbon column may be either upward or downward.

The velocity of flowing water in the biological activated carbon column is preferably in the order of SV5-30 $hr^{-1}$. Temperature of the feed water of the biological activated carbon column is preferably 10-35° C., and the pH of the feed water is preferably 4-8. So, a heat exchange unit and a pH adjuster adding means are preferably mounted upstream of the biological activated carbon column.

When the organic substance concentration of raw water is low, and ΔDO in the biological activated carbon column is less than 200 μg/L, means for adding a easily biodegradable organic substance such as acetic acid, sodium acetate, methanol, ethanol, acetone or the like to the feed water for the biological activated carbon column is preferably provided.

EXAMPLES

The present invention is more specifically described hereafter with examples and comparative examples.

Examples 1-3 and Comparative Examples 1-2

Ultrapure water was produced from industrial water and recovered water as raw waters with an ultrapure water production apparatus shown in FIG. 1.

The urea concentration of the industrial water was 20-60 μg/L, and the ammonium ion concentration of the recovered water was 1-2 mg/L. The industrial water and the recovered water were treated in an industrial water to recovered water ratio of 2:1.

Sodium hypochlorite was used as a chlorine based oxidizer, and the additive amount of sodium hypochlorite into the raw water storage tank was determined to fulfill the $Cl_2/NH_4-N$ ratios shown in Table 1.

Activated carbon used to pack the biological activated carbon column was a coal based activated carbon "KW 10-32" manufactured by Kuraray Chemical Co. Ltd. Passing water SV of the fixed bed type biological activated carbon column was 10 $hr^{-1}$. The temperature of the feed water of the biological activated carbon column was 20° C., and the pH of the feed water was 6.

The ratio of the additive amount of sodium hypochlorite to the ammonium nitrogen concentration mixed in from the recovered water, i.e., the ammonium nitrogen concentration of the mixed water of the industrial water and recovered water, expressed as $Cl_2/NH_4-N$ ratios, and the ΔDO's of the biological activated carbon column, and the TOC values and urea concentrations at the point of use are shown in Table 1. The relationship between the ΔDO and the rising velocity of differential pressure in the biological activated carbon column is shown in Table 2.

TABLE 1

|  | Comparative Examples | | Examples | | |
| --- | --- | --- | --- | --- | --- |
|  | 1 | 2 | 1 | 2 | 3 |
| $Cl_2/NH_4-N$ ratio (ratio by weight) | 2 | 4 | 5 | 8 | 10 |
| ΔDO in biological activated carbon column (μg/L) | 600 | 150 | 200 | 2000 | 2500 |
| TOC value at point of use (μg/L) | 2 | 0.8 | 0.6 | 0.6 | 0.6 |
| Urea concentration at point of use (μg/L) | 10 | 2 | <1 | <1 | <1 |

TABLE 2

| Δ DO (mg/L) | 200 | 1000 | 2000 | 2500 |
| --- | --- | --- | --- | --- |
| rising velocity of differential pressure (MPa/day) | 0 | 0 | 0 | 0.01 |

It follows from Table 1 that it is possible to reduce the urea concentration and the TOC value at the point of use by adding sodium hypochlorite so that the $Cl_2/NH_4-N$ ratio falls in the range of 5 to 8 by weight, and by biodegrading urea in the biological activated carbon column.

It further follows from Table 2 that when ΔDO of the biological activated carbon column is greater than 2000 μg/L, the rising velocity of differential pressure in the biological activated carbon column becomes high and raises the problem of proliferation of excessive fungi.

The invention claimed is:

1. An ultrapure water production method, for treating raw water in a primary pure water system and a subsystem being downstream of the system, the method comprising:
   a step of adding a chlorine-based oxidizer to water to be treated, and then
   a step of treating the water to be treated in a biological treatment unit installed upstream of the subsystem,
   wherein the chlorine-based oxidizer is added so that a concentration of the chlorine-based oxidizer in terms of $Cl_2$ is 5 to 8 times by weight of an ammonium nitrogen concentration of the water to be treated in the biological treatment unit, and
   the chlorine-based oxidizer is added so that a difference between a dissolved oxygen concentration of inlet water of the biological treatment unit and a dissolved oxygen concentration of outlet water of the biological treatment unit is 200 to 2,000 μg/L.

2. The ultrapure water production method according to claim 1, wherein the biological treatment unit is a biological activated carbon column.

3. The ultrapure water production method according to claim 1, wherein the ultrapure water production method is used to treat the raw water in a pretreatment system and then treat the resulting water in the primary pure water system and the subsystem in this order, wherein the chlorine-based oxidizer is added to the water to be treated in the pretreatment system, and the biological treatment unit is installed at a last stage of the pretreatment system and/or at a first stage of the primary pure water system.

4. An ultrapure water production apparatus including a primary pure water system which treats raw water, and a subsystem which treats water treated by the primary pure water system, the ultrapure water production apparatus comprising:
   a chlorine-based oxidizer adding unit which adds chlorine-based oxidizer to water to be treated, and a biological treatment unit installed upstream of the subsystem which treats the water to which the chlorine-based oxidizer is added,
   wherein the chlorine-based oxidizer adding unit adds the chlorine-based oxidizer so that a concentration of the chlorine-based oxidizer in terms of $Cl_2$ is 5 to 8 times by weight of an ammonium nitrogen concentration of the water to be treated in the biological treatment unit, and
   the chlorine-based oxidizer adding unit adds the chlorine-based oxidizer so that a difference between a dissolved oxygen concentration of inlet water of the biological treatment unit and a dissolved oxygen concentration of outlet water of the biological treatment unit is 200 to 2,000 μg/L.

5. The ultrapure water production apparatus according to claim 4, wherein the biological treatment unit is a biological activated carbon column.

6. The ultrapure water production apparatus according to claim 4, further comprising a pretreatment system which treats the raw water, wherein the water treated in the pretreatment system is treated in the primary pure water system and the subsystem in this order, the chlorine-based oxidizer is added to the water to be treated in the pretreatment system by the chlorine-based oxidizer adding unit, and the biological treatment unit is installed at a last stage of the pretreatment system and/or at a first stage of the primary pure water system.

7. The ultrapure water production method according to claim 1, wherein the raw water contains urea.

8. The ultrapure water production apparatus according to claim 4, wherein the raw water contains urea.

* * * * *